(12) United States Patent
Taomo et al.

(10) Patent No.: US 7,007,660 B2
(45) Date of Patent: Mar. 7, 2006

(54) PORTABLE POWER WORKING MACHINE

(75) Inventors: Toshio Taomo, Tokyo (JP); Kouji Arahata, Tokyo (JP); Tomoki Itoh, Tokyo (JP)

(73) Assignee: Kioritz Corporation, Tokyo (JP)

( * ) Notice: Subject to any disclaimer, the term of this patent is extended or adjusted under 35 U.S.C. 154(b) by 0 days.

(21) Appl. No.: 10/933,571

(22) Filed: Sep. 3, 2004

(65) Prior Publication Data

US 2005/0050867 A1 Mar. 10, 2005

(30) Foreign Application Priority Data

Sep. 8, 2003 (JP) .............................. 2003-315310

(51) Int. Cl.
*F02B 77/00* (2006.01)

(52) U.S. Cl. ..................................... 123/198 E; 55/383
(58) Field of Classification Search ............ 123/198 E, 123/41.56, 41.7; 55/383, DIG. 28
See application file for complete search history.

(56) References Cited

U.S. PATENT DOCUMENTS 5,526,777 A 6/1996 Taomo et al.

6,378,467 B1 * 4/2002 Kobayashi et al. ...... 123/41.56

* cited by examiner

Primary Examiner—Noah P. Kamen
(74) Attorney, Agent, or Firm—Baker Botts L.L.P

(57) ABSTRACT

A portable power working machine is disclosed, which is capable of effectively minimizing the clogging of the air cleaner, thereby dispensing with frequent maintenance. This portable power working machine comprises an air cleaner (30) having a base body case (32) provided with a clean air discharge port (33) for introducing the air cleaned into an intake port (25) of a carburetor (14), a filter (35) which is mounted on a filter mounting opening (32a) of base body case (32) so as to seal it, and a cleaner cover (37) which is attached onto the filter (35) so as to cover the filter (35) and to guide outside air toward the filter (35), while giving a predetermined directionality to the outside air. The air cleaner (30) is also configured to include a suction port (50) and a suction guiding member (55) both designed to discharge the dust out of the air cleaner (30) through a space formed between the filter (35) and the cleaner cover (37) as the dust adhered to the outside air side of the filter (35) is sucked out by taking advantage of a negative pressure to be generated by a fan (22).

9 Claims, 5 Drawing Sheets

PORTABLE POWER WORKING MACHINE

BACKGROUND OF THE INVENTION

The present invention relates to a portable power working machine such as a brush cutter, a hedge trimmer, etc., which is provided with an internal combustion engine as a driving power source for driving the working components thereof, and in particular, to a portable power working machine which is designed to prevent, as much as possible, an air cleaner attached to an air intake system of an internal combustion engine from being clogged with dust.

One example of the brush cutter representing one embodiment of this kind of portable power working machine is shown in FIG. 5. The brush cutter 2 shown in FIG. 5 is provided, at the distal end portion of the operating rod 3, with a working portion (cutting blade actuating mechanism) 5 comprising a cutting blade 6, a gear case 7, a safety cover 8, etc. The brush cutter 2 is also provided, at the rear end portion of the operating rod 3, with an internal combustion engine (a small air-cooled internal combustion engine) 10 acting as a driving power source for driving the cutting blade 6 through a transmission shaft 4 housed inside the operating rod 3. To this internal combustion engine 10, there are attached a recoil starter 16 and a fuel tank 17. In the air intake system for this internal combustion engine 10, there are disposed an air cleaner 30' and a carburetor 14 having a throttle valve.

The air that has been purified from the outside air taken up through the air cleaner 30' is allowed to mix with fuel by means of the carburetor 14 to form an air-fuel mixture, which is then introduced via a crank chamber into a combustion chamber. The air-fuel mixture thus introduced into the combustion chamber is then ignited and explosively burnt by means of an ignition plug 15, thereby generating driving power to actuate the working portion 5. Further, the operating rod 3 is also provided, at an intermediate portion thereof, with a U-shaped handle 9 for maneuvering the working portion 5 right and left or up and down so as to perform brush cutting operation.

In this case, the air cleaner to be disposed in the air intake system of the internal combustion engine is generally provided therein with a filter made of felt, nonwoven fabric, etc. By making use of the negative intake pressure of the internal combustion engine, outside air is sucked through an intake port provided, for example, at a lower portion of the engine and cleaned (the removal of dust) by making use of the filter before the air is introduced into the combustion actuating chamber of the internal combustion engine. In view of the structure of the air cleaner however, the clogging of the filter due to dust would be unavoidably caused to occur, so that the maintenance (the cleaning of the filter or the exchange of the filter with a new one) of the air cleaner is required to be performed periodically, the frequency thereof being dependent on the environment of use and the operating time of the engine. For example, when the brush cutter is used in an environment where a great amount of dust is generated in the operation of the brush cutter, the maintenance of the air cleaner would be required to be performed quite frequently.

As a measure for extending the cycle interval of such maintenance, there has been proposed, for example, a method (see for example, JP Utility Model Registration No. 2595842, pages 1–3, FIGS. 1–6) that makes use of the negative suction pressure generated due to the operation of the cooling fan of the internal combustion engine to generate a stream of air in addition to the air flow which is sucked via the filter into the carburetor (through the intake port thereof). This additional stream of air is designed to flow along the external surface of the filter before the air is finally discharged out of the air cleaner, thereby making it possible to remove the dust which may become a cause for the clogging of the filter.

As explained above, the conventional portable power working machine such as a brush cutter is accompanied with problems that, since dust including chips of branches or leaves of relatively large size, sand-like dust, etc. is permitted to be blown up in the operation of the portable power working machine, the outside air to be sucked into the air cleaner is permitted to intermingle with a large quantity of such dust, thereby accelerating the speed of the clogging of the filter. As a result, the cycle interval of the maintenance of the air cleaner is shortened and hence correspondingly deteriorates the working efficiency of the working machine.

BRIEF SUMMARY OF THE INVENTION

The present invention has been made to solve the aforementioned problem, and therefore, an object of the present invention to provide a portable power working machine which is capable of minimizing, as much as possible, the clogging of the air cleaner to thereby dispense with frequent maintenance, thus making it possible to improve the system's working efficiency.

With a view to attaining the aforementioned objects, there is provided, in accordance with the present invention, a portable power working machine comprising: an internal combustion engine provided, at an air intake system thereof, with an air cleaner; and a working portion to be driven by the internal combustion engine; wherein the air cleaner includes a base body case provided with a clean air discharge port for introducing the air cleaned into an intake port of a carburetor, by a filter which is mounted on a filter mounting opening of the base body case so as to seal the filter mounting opening, and by a cleaner cover which is attached onto the filter so as to cover the filter and to guide outside air toward the filter, while giving a predetermined directionality to the outside air. The air cleaner is also configured to include a suction port and a suction guiding member both designed to discharge the dust out of the air cleaner through a space formed between the filter and the cleaner cover as the dust adhered to the outside air side of the filter is sucked out by taking advantage of a negative pressure to be generated by a fan.

In a preferred embodiment, the cleaner cover is provided with a partitioning plate member for permitting outside air to enter into the air cleaner from an opening formed at the underside of said cleaner cover and for guiding the outside air toward the filter through a space formed over the partitioning plate member, and the suction port is provided to communicate with a suction opening formed at a lower end portion of space formed between the partitioning plate member and the filter.

In a more preferred embodiment, the suction port is provided below the filter, and the suction port is connected with the suction guiding member.

The suction guiding member preferably comprises a tubular body or a cylindrical body.

More preferably, the suction guiding member is disposed such that the terminal end portion thereof is located in the vicinity of the intake port of the cooling fan of the internal combustion engine.

According to the aforementioned preferred embodiment of the portable power working machine of the present invention which is constructed as described above, when the internal combustion engine is started, outside air is permitted to enter into the air cleaner due to the negative suction pressure of the engine, and the air thus sucked into the air cleaner (most of the air) is cleaned by way of the filter. The resultant clean air is then introduced, from the clean air discharge port formed in the base body case and through the suction port of the carburetor for example, into the crank chamber together with fuel. The clean air-fuel mixture thus introduced into the crank chamber is then introduced, via a scavenging passageway, into a combustion chamber placed above the piston and ignited by means of an ignition plug and explosively burnt in the combustion chamber, thus generating combustion gas (exhaust gas), which is subsequently discharged through an exhaust port into the external atmosphere.

On the other hand, the suction force to be created by the negative pressure generated through the operation of the cooling fan of the internal combustion engine is permitted to act, through the guiding member and the suction port, on the outside air side of the filter disposed inside the air cleaner, so that, separate from the cleaned air to be sucked into the internal combustion engine (i.e. the crank chamber thereof), part of the air sucked into the air cleaner is permitted to pass along the outside air side surface of the filter without passing through the filter. As a result, the dust adhered onto the filter is caused to peel away by this part of the air which is then sucked out, through the suction port and the suction guiding member, at a region in the vicinity of the cooling fan (i.e. a negative pressure-generating region), wherein this part of the air is further speeded up and pressurized by the effect of the cooling fan, thus permitting this part of the air to be discharged into the external atmosphere.

According to the aforementioned preferred embodiment of the portable power working machine of the present invention, an air flow which does not pass through the filter is created separately from a stream of cleaned air to be sucked into the internal combustion engine (i.e. the crank chamber thereof) by taking advantage of the negative pressure generated through the operation of the cooling fan of the internal combustion engine. This makes it possible, by means of this air flow, to effectively remove the dust, i.e. a cause for clogging the filter. At the same time, since this air flow accompanying the dust is discharged by making use of the cooling fan, etc., the progress of the clogging of the filter can be effectively suppressed. As a result, it is possible to extend the cycle of the maintenance of the air cleaner and to dispense with frequent maintenance of the air cleaner, thus enhancing the system's working efficiency.

DETAILED DESCRIPTION OF THE INVENTION

One embodiment of the present invention will be explained in detail with reference to the drawings as follows.

Figure 1:
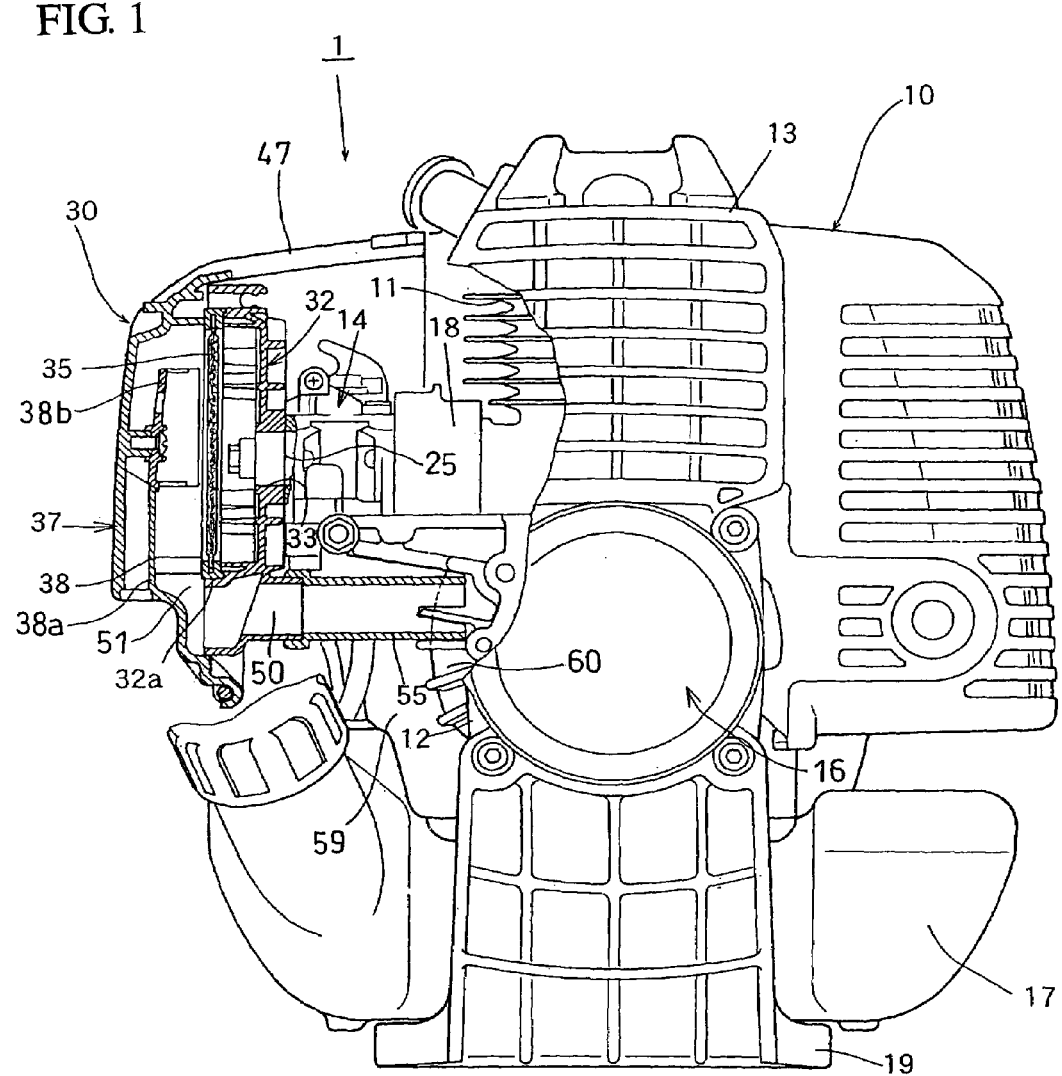
FIG. 1 is a partially cut rear side view illustrating a main portion of one embodiment of a brush cutter representing one example of the portable power working machine according to the present invention.
Figure 2:
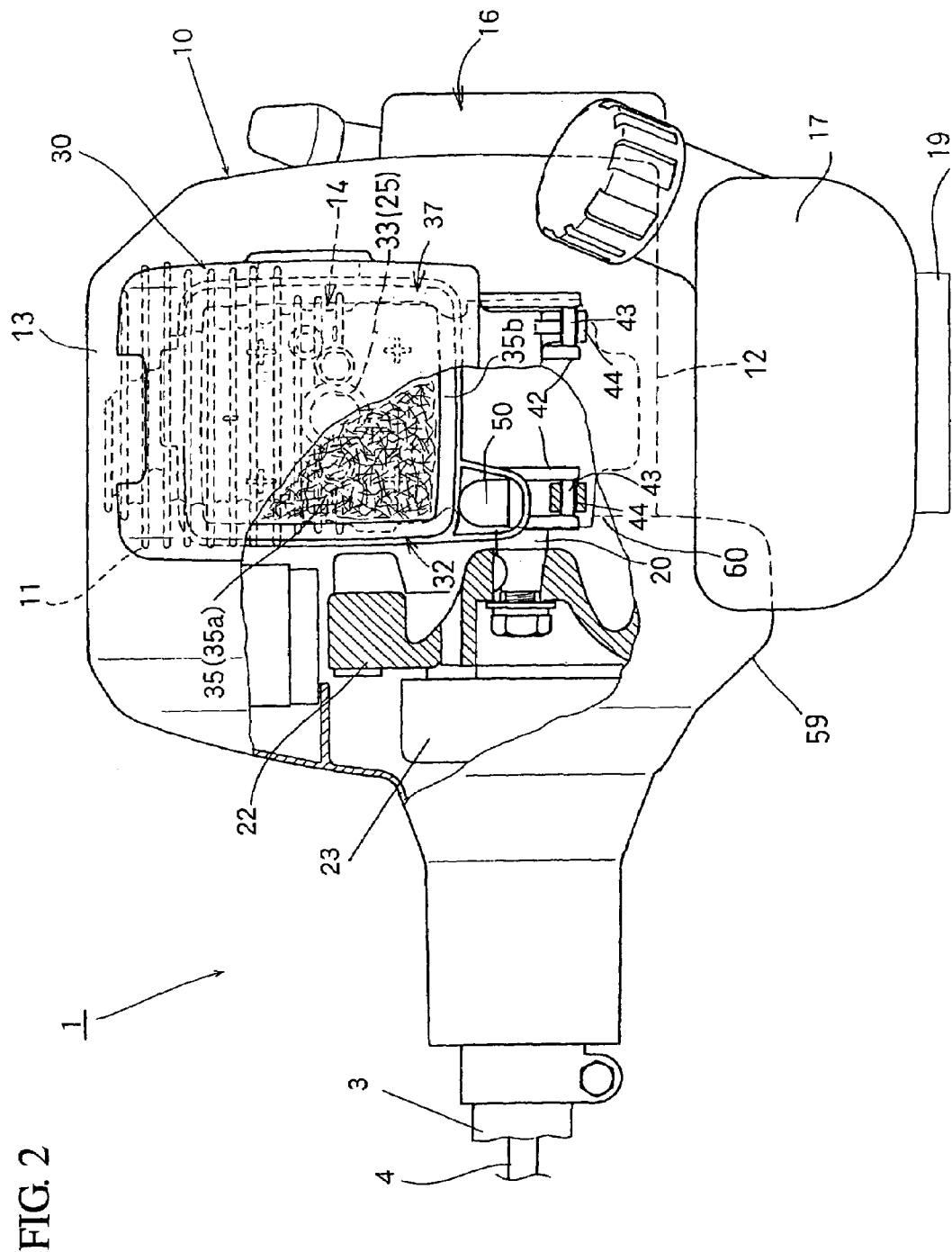
FIG. 2 is a partially cut left side view of a main portion of the brush cutter shown in FIG. 1.
Figure 5:
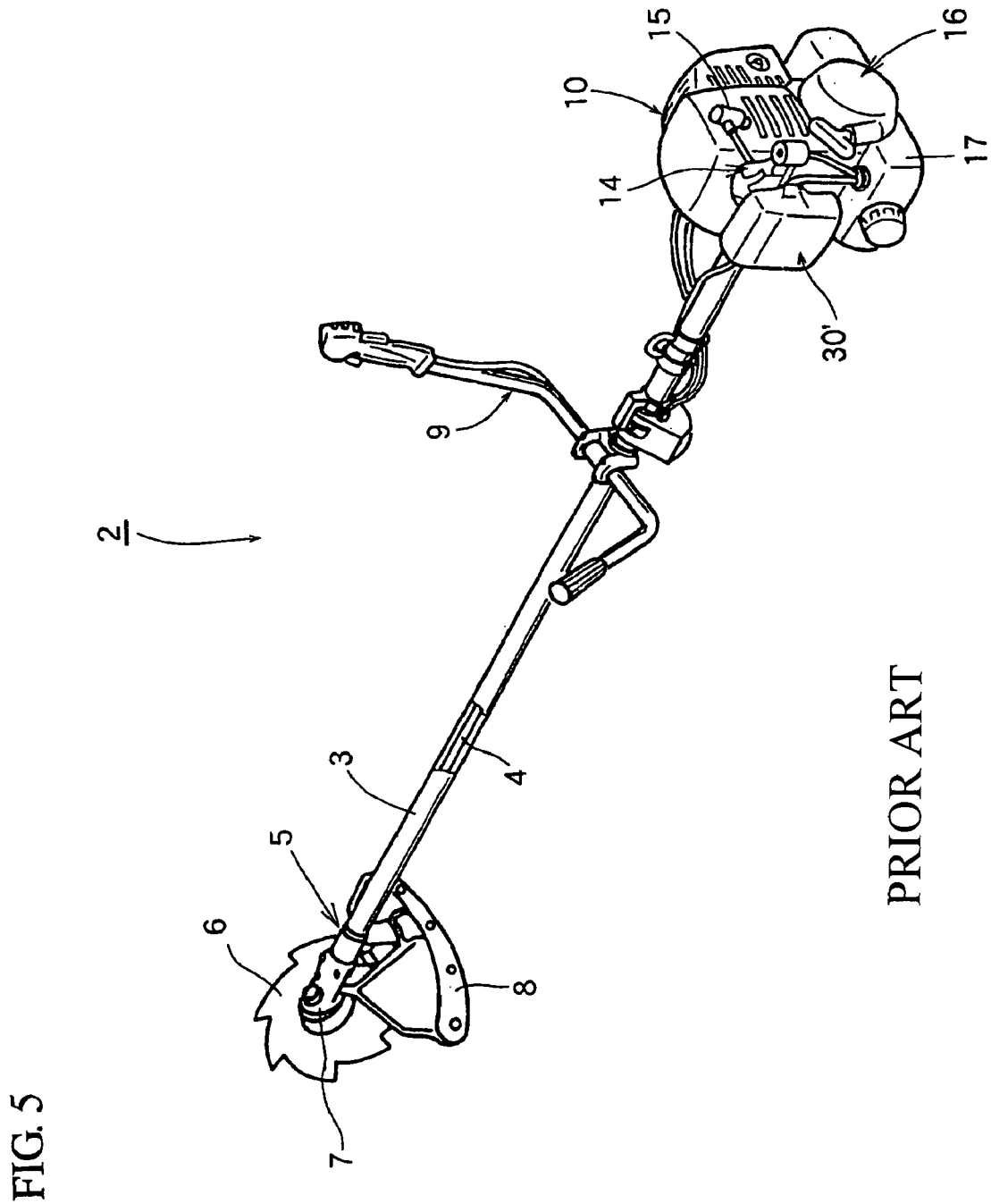
FIG. 5 is a perspective view entirely illustrating one example of a brush cutter representing one example of a portable power working machine.

FIGS. 1 and 2 illustrate a main portion of one embodiment of a brush cutter representing one example of the portable power working machine according to the present invention. The brush cutter 1 according to this embodiment is constructed of substantially the same structure as the brush cutter 2 shown in FIG. 5 except the structure around the air cleaner 30. Therefore, the components which correspond to those of the brush cutter 2 shown in FIG. 5 will be identified by the same reference numbers, thereby omitting duplicated explanation thereof, and hence only the main portions shown in FIGS. 1 and 2 will be explained in the following description.

The brush cutter 1 shown therein is provided, at a rear end portion of an operating rod 3, with an internal combustion engine (a small, air-cooled, two-stroke cycle gasoline engine) 10 employed as a power source for driving a cutting blade 6 through a transmission shaft 4 housed in the operating rod 3. More specifically, this internal combustion engine 10 is mounted in such a manner that it is vertically orientated over a fuel tank 17 secured on a supporting pedestal 19 and that it is positioned on the right side of an air intake system comprising a carburetor 14 which is attached through the air cleaner 30 and a heat insulator 18 to the internal combustion engine 10.

The internal combustion engine 10 is provided with a cylinder 11 in which the piston is inserted, with a crankcase 12 which is linked to a lower end portion of the cylinder 11, and with a cover 13 covering these components. A cooling fan 22 (acting also as a power generating magnet rotor) is secured to a fore-end portion of a crankshaft 20 which is rotatably supported by the crankcase 12. The rotation of the crankshaft 20 is designed to be transmitted, via the cooling fan 22 and a centrifugal clutch 23, to the transmission shaft 4.

Figure 3:
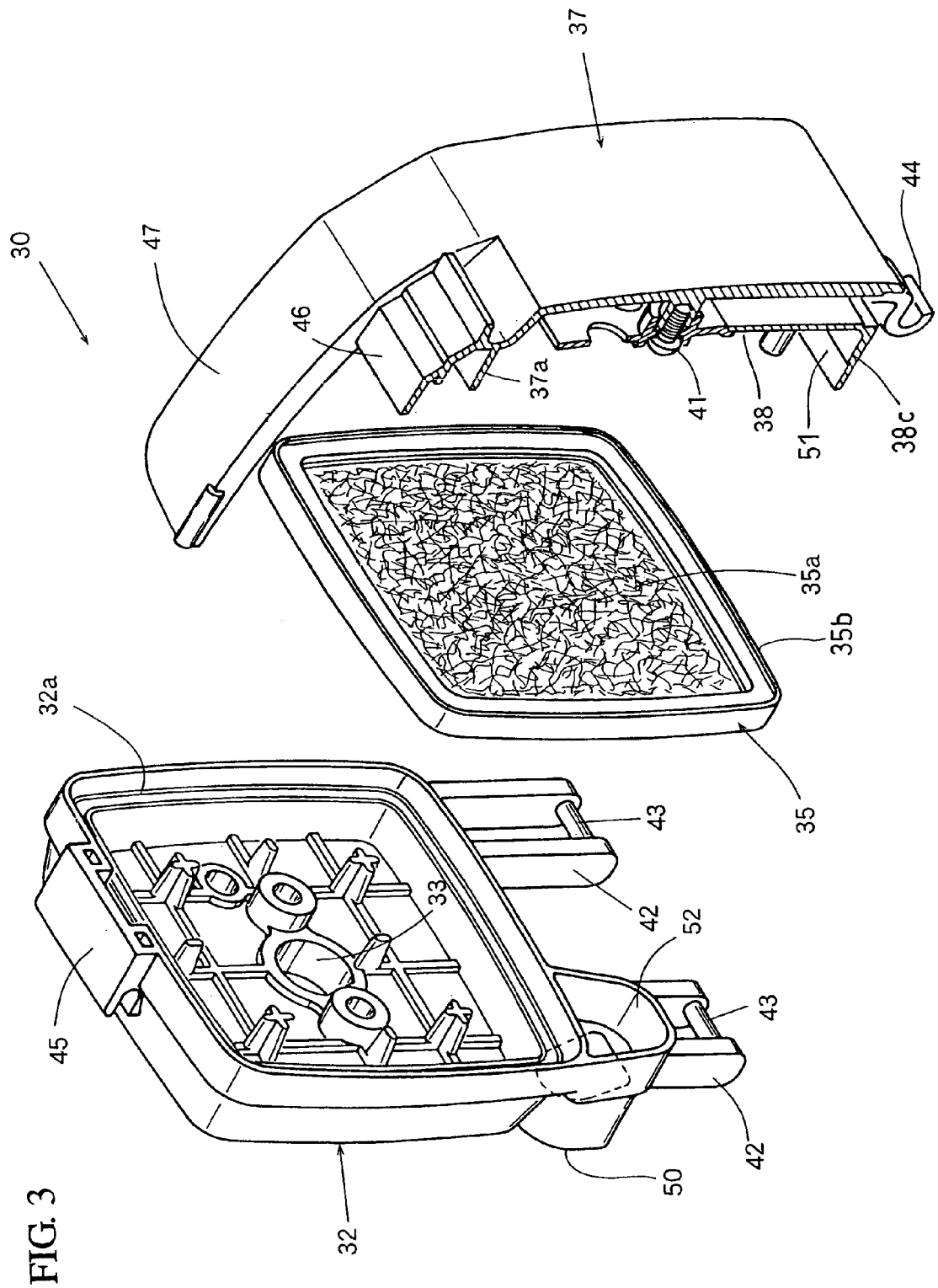
FIG. 3 is an exploded perspective view illustrating an air cleaner to be employed in the brush cutter shown in FIG. 1.
Figure 4:
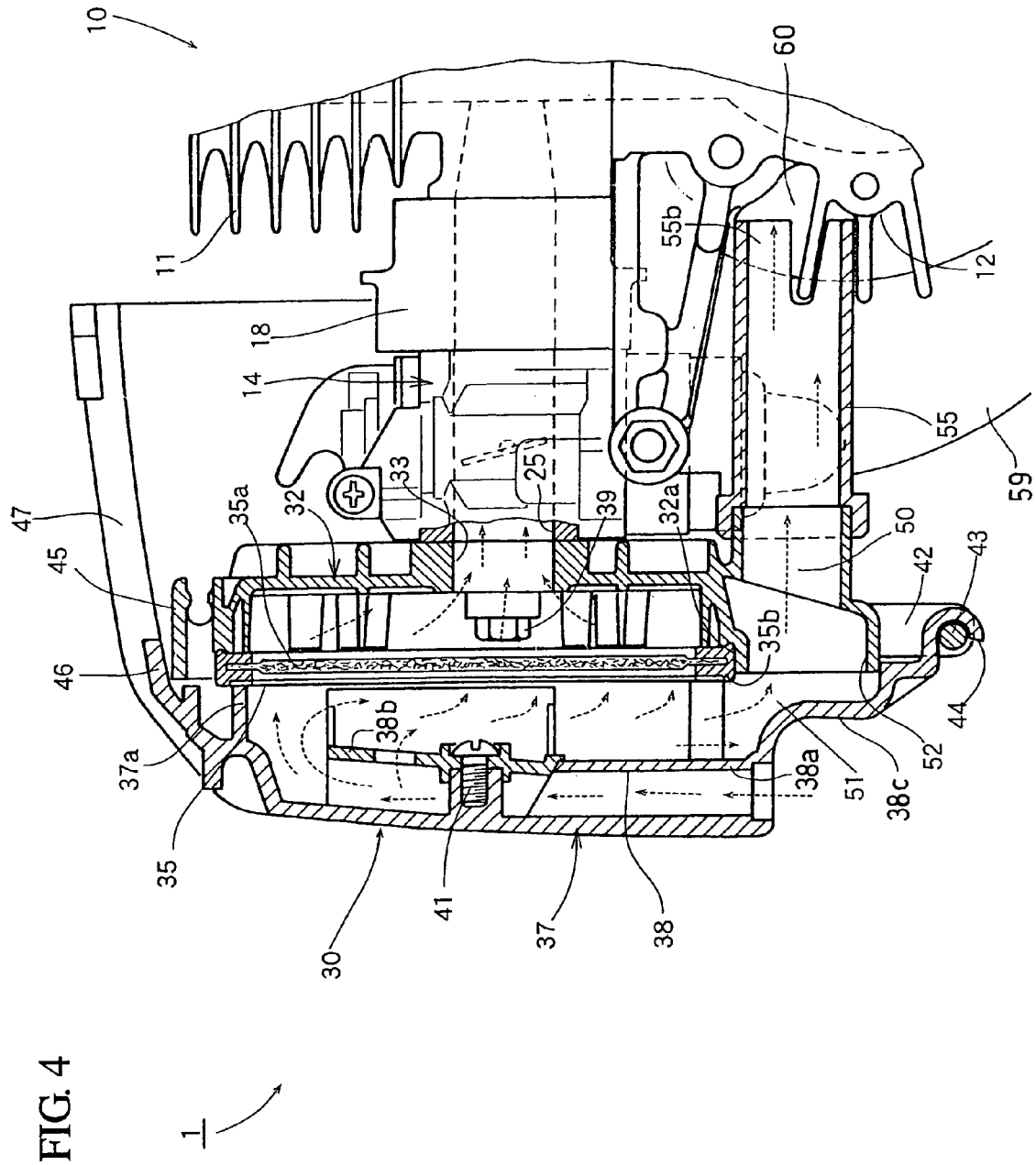
FIG. 4 is a partially cut enlarged side view illustrating a region around the air cleaner of the brush cutter shown in FIG. 1.

As seen from FIGS. 3 and 4 in addition to FIGS. 1 and 2, the air cleaner 30 is provided with a base body case 32 having a rectangular tray-like configuration and provided with a clean air discharge port 33 for delivering the cleaned air to the intake port 25 of the carburetor 14, with a plate-like filter 35 made of felt 35a and mounted so as to seal the filter mounting opening 32a of the base body case 32, and with a cleaner cover 37 detachably and hermetically mounted on the base body case 32 so as to cover the filter 35 and to guide outside air toward the filter 35 while giving a predetermined directionality to the outside air.

More specifically, the base body case 32 is fixedly secured to the carburetor 14 by means of bolts 39, and the filter 35 is pressed against the base body case 32 by means of a holding member 37a which is attached to the cleaner cover 37.

On the inner side of the cleaner cover 37, there is disposed a partitioning plate member 38 for permitting outside air to enter into the air cleaner from an opening formed at a lower end 38a of the partitioning plate member 38 and for guiding the outside air toward the filter through an upper portion 38b of the partitioning plate member 38. More specifically, this partitioning plate member 38 is secured by means of a locking screw 41 to the filter 35 substantially in parallel therewith. A lower portion 38c of this partitioning plate member 38 is bent toward the base body case 32, and J-shaped hook portions 44 attached to this lower portion 38c are adapted to be engaged with lock pins 43 of engaging portions 42 which are protruded downward at a lower portion of the base body case 32. Further, at an upper portion of the cleaner cover 37, there are provided not only an engaging portion 46 which is adapted to be engaged with the engaging portion 45 formed at an upper portion of the base body case 32 but also a ceiling member 47 configured contiguous with the engine cover 13. This cleaner cover 37 can be removed from the base body case 32 through a series of manipulations including the disengagement thereof from the engaging portion 46, and the pivotal outward (left-ward) movement of the upper portion of the cleaner cover 37 to disengage the hook portions 44 from the lock pins 43. By reversing these manipulations, this cleaner cover 37 can be easily attached to the base body case 32.

In this embodiment, a suction port 50 is provided between the lower portion 38c of the partitioning plate member 38 and the lower end portions of the filter 35 and the base body case 32. This suction port 50 is disposed at a lower corner portion and on the cooling fan 22 side (front-side) of the air cleaner 30 and comprises a suction opening 51 formed between the lower end 38a of the partitioning plate member 38 and the lower end portion 35b of the filter 35; and a suction hole 52 provided in the base body case 32.

This suction port 50 is connected with a tubular or cylindrical suction guiding member 55 extending substantially horizontally. A terminal end portion 55b of the suction guiding member 55 is disposed at a region close to the crankcase 12 as well as to the cooling fan 22, i.e. a region where a negative pressure generated in the vicinity of the intake port 60 provided in the fan case 59 of the cooling fan 22 is enabled to act.

According to the brush cutter 1 of this embodiment which is constructed as described above, when the internal combustion engine 10 is started, as indicated by dashed arrows in FIG. 4, due to the negative sucking pressure of the engine 10, outside air is sucked upward from the underside of the engine 10 and allowed to pass through a space between the cleaner cover 37 and the partitioning plate member 38 inside the air cleaner 30. The air thus sucked into the air cleaner (most of the air) is reversed in flowing direction at the upper portion 38b of the partitioning plate member 38 and hence the outside air is permitted to flow downward from the upper portion 38b, thus enabling the outside air to pass along the surface of the outside air side of the filter 35. Then, the outside air is permitted to pass through the filter 35 to clean the outside air. The outside air thus cleaned is sucked, via the clean air discharge port 33 formed in the base body case 32, the carburetor 14, and the heat insulator 18, into the crank chamber (inside the crankcase 12) together with fuel. The clean air-fuel mixture thus introduced into the crank chamber is then introduced, via a scavenging passageway, into a combustion chamber above the piston and ignited by means of an ignition plug and explosively burnt in the combustion chamber, thus generating combustion gas (exhaust gas), which is subsequently discharged through an exhaust port into the external atmosphere.

On the other hand, the suction force to be created by the negative pressure generated through the operation of the cooling fan 22 of the internal combustion engine 10 is permitted to act, through the suction guiding member 55 and the suction port 50, on the outside air side of the filter 35 disposed inside the air cleaner 30, so that, separately from the cleaned air to be sucked into the internal combustion engine 10 (i.e. the crank chamber thereof), part of the air sucked into the air cleaner is permitted to pass along the outside air side surface of the filter 35 without passing through the filter 35. As a result, the dust adhered onto the outside air side of the filter 35 is caused to peel away by this part of the air which is then sucked out, through the suction port and the suction guiding member, at a region in the vicinity of the intake port 60 of the cooling fan 22 (i.e. a negative pressure-generating region), wherein this part of the air is further speeded up and pressurized by the effect of the cooling fan 22, thus permitting this part of the air to discharge into the external atmosphere.

According to the brush cutter 1 of this embodiment, since an air flow which does not pass through the filter 35 is created separate from a stream of cleaned air to be sucked into the internal combustion engine 10 (i.e. the crank chamber thereof) by taking advantage of the negative pressure generated through the operation of the cooling fan 22 of the internal combustion engine 10, it makes it possible, by means of this air flow, to effectively remove the dust, i.e. a cause for clogging the filter 35, and at the same time, since this air flow accompanying the dust is discharged by making use of the cooling fan, etc., the progress of the clogging of the filter 35 can be effectively suppressed. As a result, it is possible to prolong the cycle of the maintenance of the air cleaner 30 and to dispense with frequent maintenance of the air cleaner, thus enhancing the working efficiency of the system.

Although various embodiments of the present invention have been explained in the foregoing description, it should be understood that the present invention is not limited to these embodiments, but can be varied in design without departing from the spirit and scope of the invention set forth in the accompanying claims.

For example, in the cases of a shoulder type power scattering machine, a power blower, etc., it is possible to take advantage of a negative intake pressure of an air blasting fan used as the working component thereof.

What is claimed is:

1. A portable power working machine comprising:
an internal combustion engine provided, at an air intake system thereof, with an air cleaner; and
a working portion to be driven by the internal combustion engine;
wherein the air cleaner comprises:
a base body case provided with a clean air discharge port for introducing the air cleaned into an intake port of a carburetor,
a filter mounted on a filter mounting opening of the base body case so as to seal the filter mounting opening, and
a cleaner cover attached onto the filter so as to cover the filter and to guide outside air toward the filter, while giving a predetermined directionality to the outside air;
the air cleaner being configured to include a suction port and a suction guiding member both designed to discharge the dust out of the air cleaner through a space formed between the filter and the cleaner cover as the dust adhered to the outside air side of the filter is sucked out at least in part from a negative pressure to be generated by a fan,
wherein said cleaner cover is provided with a partitioning plate member for permitting outside air to enter into the air cleaner from an opening formed at the underside of said cleaner cover and for guiding the outside air toward the filter through an upper portion of the partitioning plate member, and the suction port is provided to communicate with a suction opening formed at a lower end portion of space formed between the partitioning plate member and the filter.

2. The portable power working machine according to claim 1, wherein said suction port is provided below the filter, and the suction port is connected with the suction guiding member.

3. The portable power working machine according to claim 2, wherein said suction guiding member comprises a tubular body or a cylindrical body.

4. The portable power working machine according to claim 2, wherein said suction guiding member is disposed such that the terminal end portion thereof is located in the vicinity of an intake port of a cooling fan of the internal combustion engine.

5. The portable power working machine according to claim 1, wherein said suction guiding member comprises a tubular body or a cylindrical body.

6. The portable power working machine according to claim 1, wherein said suction guiding member is disposed such that the terminal end portion thereof is located in the vicinity of an intake port of a cooling fan of the internal combustion engine.

7. A portable power working machine comprising:
an internal combustion engine provided, at an air intake system thereof, with an air cleaner; and
a working portion to be driven by the internal combustion engine;
wherein the air cleaner comprises:
a base body case provided with a clean air discharge port for introducing the air cleaned into an intake port of a carburetor,
a filter mounted on a filter mounting opening of the base body case so as to seal the filter mounting opening, and
a cleaner cover attached onto the filter so as to cover the filter and to guide outside air toward the filter, while giving a predetermined directionality to the outside air;
the air cleaner being configured to include a suction port and a suction guiding member both designed to discharge the dust out of the air cleaner through a space formed between the filter and the cleaner cover as the dust adhered to the outside air side of the filter is sucked out at least in part from a negative pressure to be generated by a fan,
wherein said suction port is provided below the filter, and the suction port is connected with the suction guiding member.

8. The portable power working machine according to claim 7, wherein said suction guiding member comprises a tubular body or a cylindrical body.

9. The portable power working machine according to claim 7, wherein said suction guiding member is disposed such that the terminal end portion thereof is located in the vicinity of an intake port of a cooling fan of the internal combustion engine.

* * * * *